United States Patent [19]
Gregory et al.

[11] Patent Number: 5,055,566
[45] Date of Patent: Oct. 8, 1991

[54] AMINE SALTS OF DISAZO BLACK DYES HAVING GOOD SOLUBILITY IN POLAR ORGANIC SOLVENTS

[75] Inventors: Peter Gregory, Bolton, United Kingdom; Ronald W. Kenyon, Failsworth, England

[73] Assignee: Imperial Chemical Industries PLC, London, United Kingdom

[21] Appl. No.: 540,171

[22] Filed: Jun. 19, 1990

[30] Foreign Application Priority Data

Jul. 12, 1989 [GB] United Kingdom ............... 8915958

[51] Int. Cl.$^5$ ..................... C09B 31/08; C09D 11/02
[52] U.S. Cl. .................... 534/228; 534/573; 534/836; 106/22
[58] Field of Search ................. 534/573 L, 728, 836

[56] References Cited

U.S. PATENT DOCUMENTS

| 2,038,278 | 12/1936 | Kiernan | 534/728 |
| 2,315,870 | 4/1948 | Nadler et al. | 534/728 X |
| 2,490,703 | 4/1949 | Paige | 534/728 |
| 3,640,994 | 2/1972 | Harnisch | 534/728 |
| 3,828,020 | 8/1974 | Tartter | 534/728 |
| 4,626,284 | 12/1986 | Ohta et al. | 534/836 X |
| 4,824,948 | 4/1989 | Stark et al. | 540/125 |

FOREIGN PATENT DOCUMENTS

| 60-81249 | 5/1985 | Japan | 534/836 |
| 60-108470 | 6/1985 | Japan | 534/836 |
| 2131825 | 6/1984 | United Kingdom | 534/728 |

Primary Examiner—Mary C. Lee
Assistant Examiner—Fiona T. Powers
Attorney, Agent, or Firm—Cushman, Darby & Cushman

[57] ABSTRACT

A compound of the Formula (1):

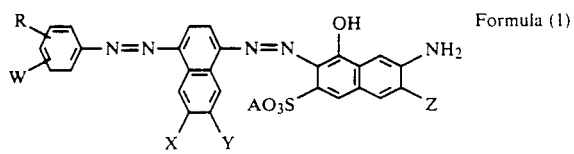

wherein
R is H, $SO_3A$, $C_{1-4}$-alkyl, $C_{1-4}$-alkoxy, $NO_2$, OH or halogen;
W, X, Y and Z are independently H or $SO_3A$; and
A is $NQ_4$ wherein at least one Q is a branched chain fatty $C_{6-20}$-aliphatic group.

8 Claims, No Drawings

AMINE SALTS OF DISAZO BLACK DYES HAVING GOOD SOLUBILITY IN POLAR ORGANIC SOLVENTS

This specification describes an invention relating to a salt of a direct black dye with an amine, having enhanced solubility in certain polar organic liquids, and its use in inks for conventional and hot melt ink-jet printing and automatic identification (AI), as a black colorant for toners and thermal wax transfer sheets and as a charge control agent (CCA) for electrophotographic toners.

According to the present invention there is provided a compound of the Formula (1):

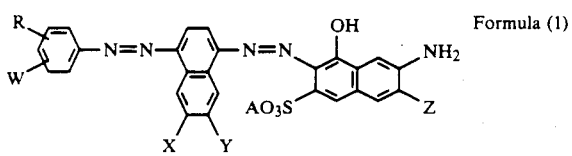

wherein:

R is H, $SO_3A$, $C_{1-4}$-alkyl, $C_{1-4}$-alkoxy, $NO_2$, OH or halogen; W, X, Y and Z are independently H or $SO_3A$; and A is a substituted ammonium group carrying at least one branched chain fatty $C_{6-20}$-aliphatic group.

The substituted ammonium group, A, is preferably of the formula:

$NQ_4$ in which at least one Q is a branched chain fatty $C_{6-20}$-aliphatic group. It is further preferred that two or three Qs, each independently represents H, $C_{1-4}$-alkyl, phenyl or benzyl. It is especially preferred that at least one, and more preferably three, of the groups represented by Q is H.

The fatty aliphatic group represented by Q preferably contains from 6 to 12, more preferably from 8 to 11, and especially preferably 8 to 10, carbon atoms. It is most preferred that Q contains 8 or 9 carbon atoms. Preferred fatty aliphatic groups are alkyl and alkenyl and more especially such groups in which the carbon chain contains at least one branch and more especially from 2 to 4 branches. Preferred alkyl groups, represented by Q, containing 8 or 9 carbon atoms, are 3,5,5-trimethylhexyl, 1,1,3,3-tetramethylbutyl and 2-ethylhexyl. Examples of other aliphatic chains are 1-ethyl-3-methylpentyl, 1,5-dimethylhexyl, 1-methylheptyl, 1,4-dimethylheptyl, 1,2,2-trimethylpropyl, 2-ethylbutyl, 1-propylbutyl, 1,2-dimethylbutyl, 2-methylpentyl, 1-ethylpentyl, 1,4-dimethylpentyl, 1-methylhexyl, 3-methylhexyl, 1,3,3-trimethylbutyl, 1-methylnonyl. The substituted ammonium group A preferably has one fatty alkyl group as described above, the remaining groups being preferably H or $C_{1-4}$-alkyl, especially H or methyl. Suitable ammonium groups include 2-ethylhexyl-ammonium, 1,1,3,3-tetramethylbutyl- ammonium and 3,5,5-trimethylhexyl-ammonium.

R is preferably H, $SO_3A$, $C_{1-4}$alkyl, OH or halo. When R is $C_{1-4}$-alkyl it is preferably methyl, and when R is halo it is preferably chloro.

In dyes of Formula (1) it is preferred that
R is hydrogen;
W is p-$SO_3A$;
X is hydrogen;
Y is $SO_3A$; and
Z is $SO_3A$.

The amine salts of the present invention are conveniently prepared by mixing an aqueous solution of an alkali metal salt, preferably the sodium salt, of the compound of Formula (1) with an aqueous solution of the amine salt, preferably the hydrochloride, to cause precipitation of the amine salt of the compound of Formula (1).

The compound of Formula (1) has generally good solubility in polar organic media, especially lower alkanols, such as methanol, ethanol, n-propanol and glycols and is particularly suitable for the preparation of inks in such media, especially inks for use in ink-jet printing equipment.

Two or more different amines may be used to prepare mixed amine salts, such salts generally having higher solubility and greater solution stability.

The invention is further illustrated by the following examples in which all parts and percentages are by weight unless otherwise indicated.

EXAMPLE 1

A mixture of 10 parts of 3,5,5-trimethylhexylamine and 50 parts of distilled water was neutralised to pH 7.0 by the addition of concentrated hydrochloric acid. 13.2 parts of CI Food Black 2 was added to 400 parts of distilled water and the pH adjusted to 7.0 by addition of aqueous sodium hydroxide solution. The solution was warmed to 45°–50° C. and the above amine hydrochloride solution added dropwise over 15 minutes and then stirred at 45°–50° C. for a further 30 minutes. The product was isolated by filtration, washed with distilled water and dried. The product was soluble in methanol and ethanol and moderately soluble in n-propanol.

EXAMPLE 2

In place of the 10 parts of 3,5,5-trimethylhexylamine used in Example 1 there was used 9 parts of t-octylamine. The product was soluble in methanol and ethanol and moderately soluble in n-propanol.

EXAMPLE 3

In place of the 10 parts of 3,5,5-trimethylhexylamine used in Example 1 there was used 9 parts of 2-ethylhexylamine. The product was soluble in methanol and ethanol.

EXAMPLE 4

In place of the 13.2 parts of CI Food Black 2 used in Example 1 there was used 11.6 parts of 1-hydroxy-2-(4-[4-sulphophenylazo]-7-sulphonaphth-1-ylazo)-3-sulpho-7-aminonaphthalene and in place of the 10 parts of 3,5,5-trimethylhexylamine there was used 7.5 parts. The product was soluble in methanol and ethanol and moderately soluble in n-propanol.

EXAMPLE 5

In place of the 13.2 parts of CI Food Black 2 used in Example 1 there was used 13.2 parts of 1-hydroxy-2-(4-[3-sulphophenylazo]-7-sulphonaphth-1-ylazo)-3,6-disulpho-7-aminonaphthalene. The product dissolved in methanol, ethanol and n-propanol.

EXAMPLE 6

In place of the 13.2 parts of CI Food Black 2 used in Example 1 there was used 13.2 parts of 1-hydroxy-2-(4-

[4-sulphophenylazo]-6-sulphonaphth-1-ylazo)-3,6-disulpho-7-aminonaphthalene. The product dissolved in methanol and ethanol and was moderately soluble in n-propanol.

EXAMPLE 7

In place of the 13.2 parts of CI Food Black 2 used in Example 1 there was used 13.6 parts of 1-hydroxy-2-(4-[3-methyl-4-sulphophenylazo]-6-sulphonaphth-1-ylazo)-3,6-disulpho-7-amino-naphthalene. The product was soluble in methanol, ethanol and n-propanol.

EXAMPLE 8

In place of the 13.2 parts of CI Food Black 2 used in Example 1 there was used 11.6 parts of 1-hydroxy-2-(4-[4-sulphophenylazo]-naphth-1-ylazo)-3,6-disulpho-7-aminonaphthalene and in place of the 10 parts of 3,5,5-trimethylhexylamine there was used 7.5 parts. The product dissolved in methanol, ethanol and n-propanol.

EXAMPLE 9

In place of the 10 parts of 3,5,5-trimethylhexylamine used in Example 1 there was used 9 parts of 1-methylheptylamine. The product dissolved in methanol, ethanol and n-propanol.

EXAMPLE 10

In place of the 10 parts of 3,5,5-trimethylhexylamine used in Example 1 there was used 9 parts of 1,5-dimethylhexylamine. The product was soluble in methanol, ethanol and n-propanol.

EXAMPLE 11

In place of the 13.2 parts of CI Food Black 2 used in Example 1 there was used 12.4 parts of 1-hydroxy-2-(4-[2-hydroxy-5-sulphophenylazo]-7-sulphonaphth-1-ylazo)-3-sulpho-7-aminonaphthalene and 7.5 parts of 3,5,5-trimethylhexylamine. The product was soluble in methanol, ethanol and n-propanol.

EXAMPLE 12

In place of the 13.2 parts of CI Food Black 2 used in Example 1 there was used 13.2 parts of 1-hydroxy-2-(4-[2,5-disulphophenylazo]-7-sulphonaphth-1-ylazo)-3-sulpho-7-aminonaphthalene. The product was soluble in methanol, ethanol and n-propanol.

EXAMPLE 13

In place of the 13.2 parts of CI Food Black 2 used in Example 1 there was used 13.6 parts of 1-hydroxy-2-(4-[2-methyl-4-sulphophenylazo]-7-sulphonaphth-1-ylazo)-3,6-disulpho-7-aminonaphthalene. The product was soluble in methanol, ethanol and n-propanol.

EXAMPLE 14

In place of the 13.2 parts of CI Food Black 2 used in Example 1 there was used 13.8 parts of 1-hydroxy-2-(4-[4-chloro-3-sulphophenylazo]-7-sulphonaphth-1-ylazo)-3,6-disulpho-7-aminonaphthalene. The product dissolved in methanol, ethanol and n-propanol.

EXAMPLE 15

In place of the 13.2 parts of CI Food Black 2 used in Example 1 there can be used 13.7 parts of 1-hydroxy-2-(4-[4-methoxy-2-sulphophenylazo]-7-sulphonaphth-1-ylazo)-3,6-disulpho-7-aminonaphthalene.

EXAMPLE 16

In place of the 13.2 parts of CI Food Black 2 used in Example 1 there can be used 14.0 parts of 1-hydroxy-2-(4-[4-nitro-2-sulphophenylazo]-7-sulphonaphth-1-ylazo)-3,6-disulpho-7-aminonaphthalene.

EXAMPLE 17

In place of the 13.2 parts of CI Food Black 2 used in Example 1 there can be used 14.0 parts of 1-hydroxy-2-(4-[5-nitro-2-sulphophenylazo]-7-sulphonaphth-1-ylazo)-3,6-disulpho-7-aminonaphthalene.

We claim:

1. A compound of the Formula (1):

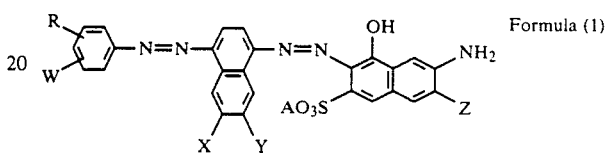

Formula (1)

wherein

R is H, SO$_3$A, C$_{1-4}$-alkyl, C$_{1-4}$-alkoxy, NO$_2$, OH or halogen;

W, X, Y and Z are independently H or SO$_3$A; and

A is NQ$_4$ wherein at least one Q is a branched chain fatty C$_{6-20}$-alkyl group.

2. A compound according to claim 1 in which at least one Q is a branched chain C$_{6-12}$-alkyl group.

3. A compound according to claim 1 in which at least one Q is a branched chain C$_{8-10}$-alkyl group.

4. A compound according to claim 1 in which at least one Q is 3,5,5-trimethylhexyl,
1,1,3,3-tetramethylbutyl,
2-ethylhexyl,
1-ethyl-3-methylpentyl,
1,5-dimethylhexyl,
1-methylheptyl,
1,4-dimethylheptyl,
1,2,2-trimethylpropyl,
2-ethylbutyl,
1-propylbutyl,
1,2-dimethylbutyl,
2-methylpentyl,
1-ethylpentyl,
1,4-dimethylpentyl,
1-methylhexyl,
3-methylhexyl,
1,3,3-trimethylbutyl, or
1-methylnonyl.

5. A compound according to any of claims 1 to 4 in which three Q's are H.

6. A compound according to any of claims 1 to 5 in which R is H, SO$_3$A, C$_{1-4}$-alkyl or halogen.

7. A compound according to any of claims 1 to 6 in which X is H, Y is SO$_3$A and Z is SO$_3$A.

8. A compound according to any of claims 1 to 4 wherein R and X are hydrogen and W, Y and Z are SO$_3$A.

* * * * *